United States Patent

Belisle et al.

[15] 3,652,353
[45] Mar. 28, 1972

[54] METHOD OF MAKING A NON-WOVEN REINFORCED LAMINATE

[72] Inventors: Alfred E. Belisle, Westbrook, Maine; John C. Nelson, Appleton, Wis.

[73] Assignee: Fox River Paper Corp., Appleton, Wis.

[22] Filed: June 9, 1969

[21] Appl. No.: 831,334

[52] U.S. Cl. ..............................156/62.4, 156/272, 156/369
[51] Int. Cl. .........................................................B32b 17/00
[58] Field of Search ..................156/62.2, 62.4, 62.8, 297, 156/272, 380, 177, 178, 179, 180, 181, 582, 369-377

[56] References Cited

UNITED STATES PATENTS

| | | | |
|---|---|---|---|
| 3,235,913 | 2/1966 | Schuller | 156/62.2 |
| 3,037,897 | 6/1962 | Pelley | 156/79 |
| 3,553,065 | 5/1966 | Stumpf et al | 156/73 |
| 3,449,187 | 6/1969 | Bobkowicz | 156/161 |
| 2,998,051 | 8/1961 | Sittel | 156/369 |
| 2,152,077 | 3/1939 | Meston et al | 156/272 |

Primary Examiner—Benjamin A. Borchelt
Assistant Examiner—H. J. Tudor
Attorney—Parker, Carter & Markey

[57] ABSTRACT

Disclosed is a non-woven reinforced laminate having an upper and lower web with two layers of fibers therebetween, wherein the fibers are substantially parallel within each of the layers and substantially perpendicular to the fibers in the adjacent and a method and apparatus for forming the laminate which include driving a web material along a predetermined route, applying an adhesive to the web in a predetermined pattern, depositing portion of fibers onto the adhesive, causing the remaining free portions of the fibers to stand upwardly from the web, deflecting the upstanding free portions to the surface of the web at an angle relative to the route direction, and laminating the web having the deflected fibers to a second web similarly processed whereby the fibers of the adjoining layers are substantially perpendicularly disposed with respect to each other.

18 Claims, 12 Drawing Figures

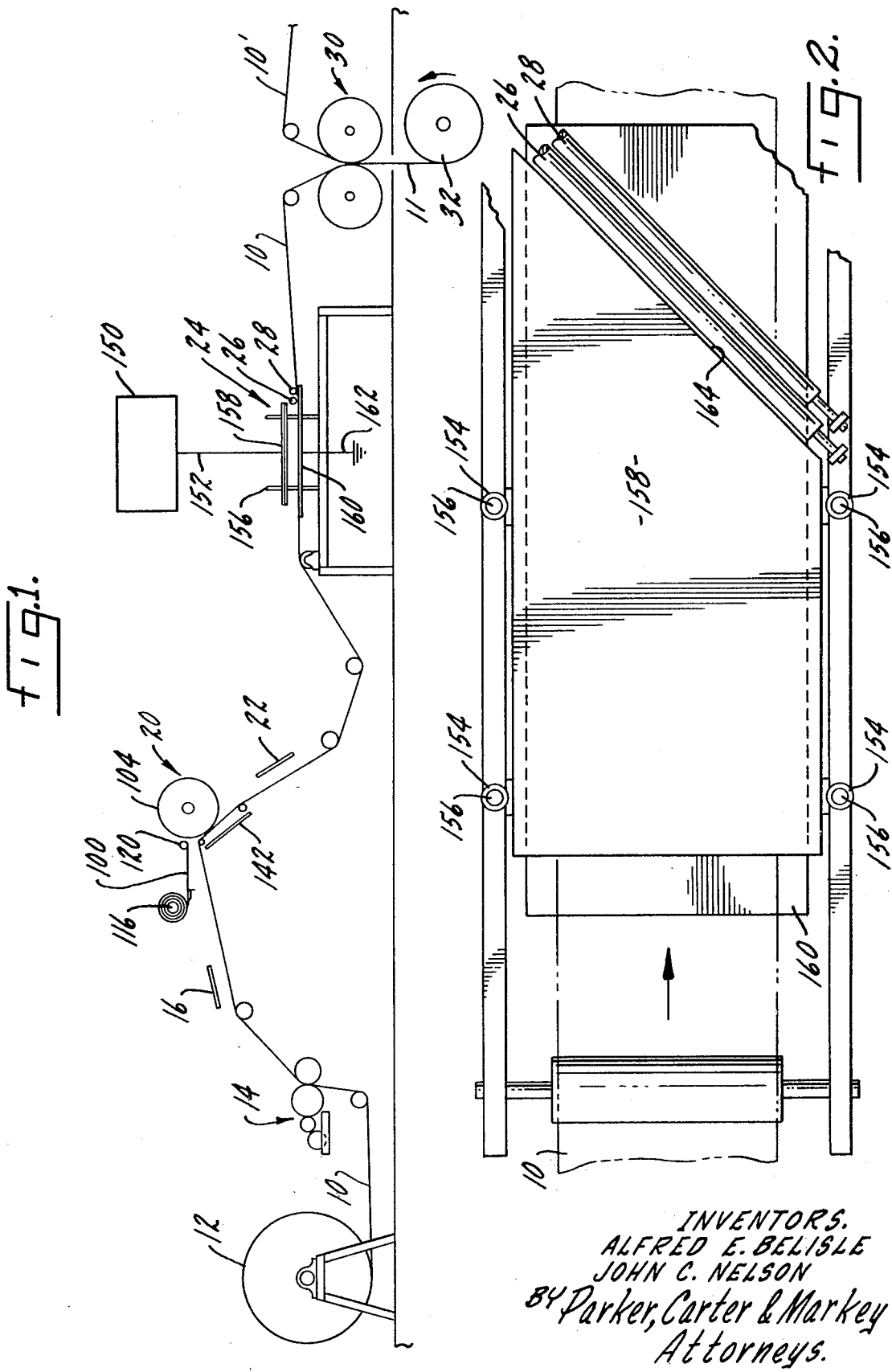

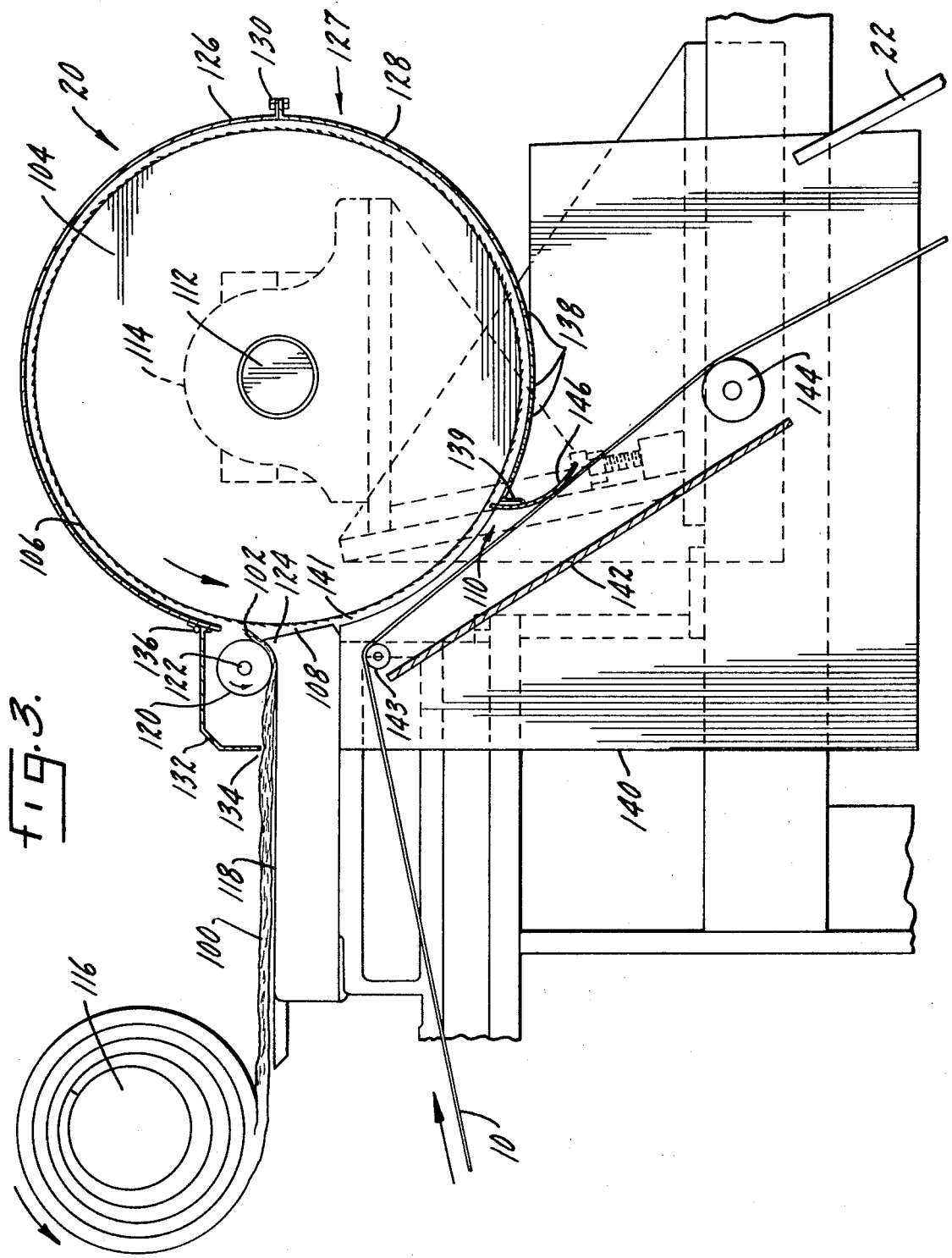

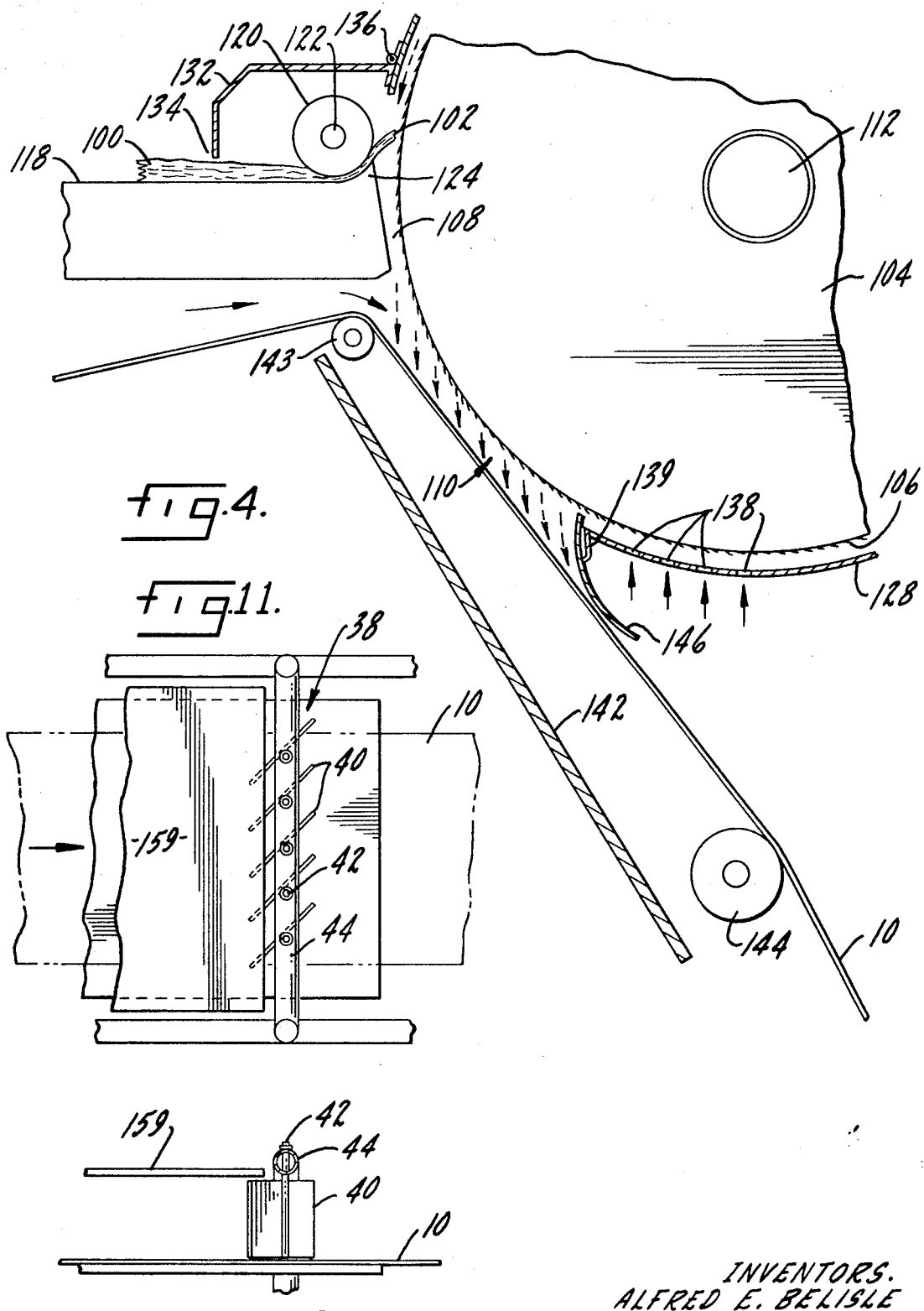

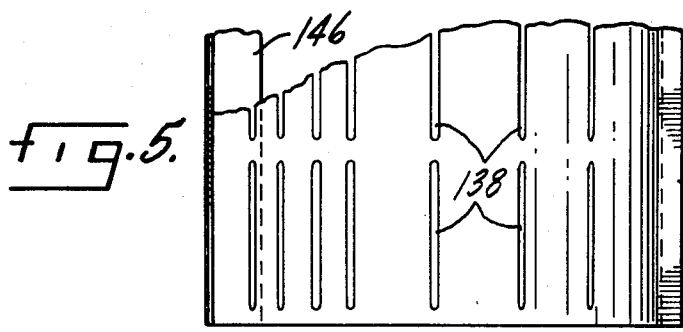
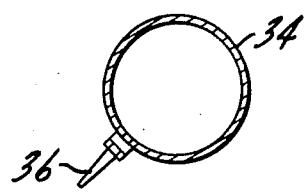
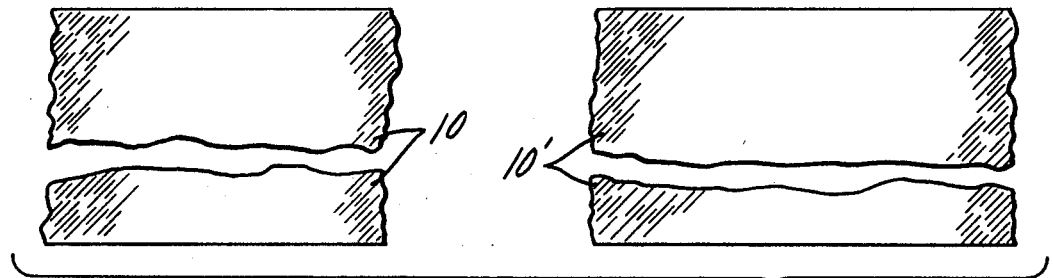
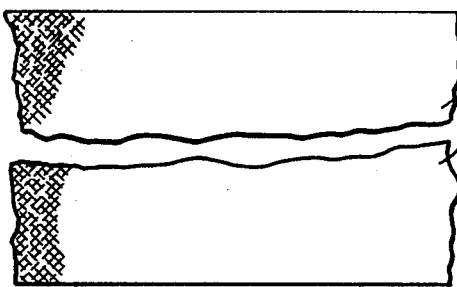
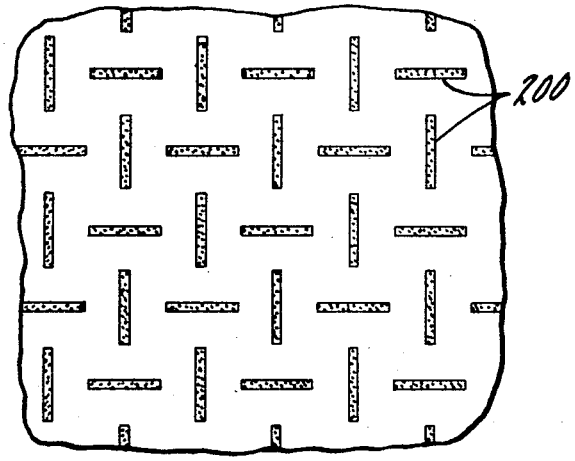
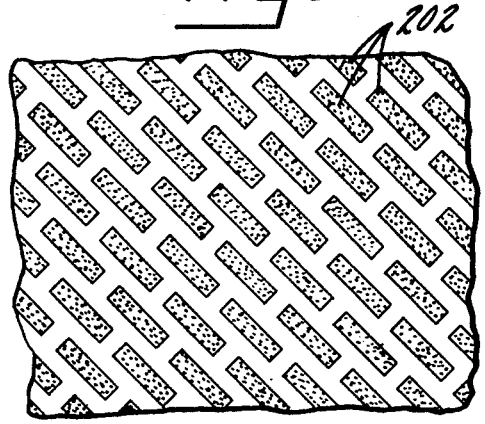

METHOD OF MAKING A NON-WOVEN REINFORCED LAMINATE

SUMMARY OF THE INVENTION

The primary object of the invention is a nonwoven reinforced laminate and a method and apparatus for forming the same.

Another object is a method that enables high speed, high volume, continuous formation of a nonwoven reinforced laminate.

Another object is apparatus that has the capacity for high speed, high volume, continuous formation of a nonwoven reinforced laminate.

Another object is a method whereby fibers can be efficiently and evenly deposited on a web material that has either foraminous or nonforaminous characteristics.

Another object is apparatus that can deposit fibers efficiently and evenly on a web that has either foraminous or nonforaminous characteristics.

Another object is to provide a method and apparatus productive of higher web speeds and resultant increase in volume production.

Another object is a nonwoven reinforced laminate that can function as a disposable substitute for a cloth fabric.

Another object is a nonwoven reinforced laminate that has good tear strength characteristics in all directions.

Another object is a nonwoven reinforced laminate that has an absence of surface seams.

Other objects may appear in the ensuing specification, drawings and claims.

BRIEF DESCRIPTION OF THE DRAWINGS

FIG. 1 is a schematic illustration of the apparatus for forming the laminate.

FIG. 2 is a top view, on an enlarged scale, of a portion of the apparatus of FIG. 1.

FIG. 3 is a side view, on an enlarged scale, of a portion of the apparatus of FIG. 1 showing the fiber deposition mechanism.

FIG. 4 is a side view, on an enlarged scale, illustrating a fiber and air contract structure of the invention.

FIG. 5 is a top view of the lower enclosure of the fiber deposition mechanism.

FIG. 6 is a cross sectional view of a variant form of a portion of the apparatus shown in FIG. 2.

FIG. 7 is a top view of each of the webs prior to lamination.

FIG. 8 is a view of the completed laminate.

FIG. 9 is a view of an adhesive application pattern.

FIG. 10 is a variant form of adhesive application pattern.

FIG. 11 is a view of a variant form of deflecting means.

FIG. 12 is a side view of the deflecting means of FIG. 11.

DESCRIPTION OF THE PREFERRED EMBODIMENT

The apparatus shown generally in FIG. 1 is a form of apparatus useful in the practice of the method of the invention. The method utilizes a web of relatively thin normally flexible material that may be chosen from a variety of products. The nature of the method does not require the web to have either foraminous or nonforaminous characteristics.

The web 10 originating from a source such as takeoff reel 12, is continuously driven through a series of operations or steps, the first of which is the application of an adhesive to the web by the apparatus indicated generally at 14.

The adhesive is applied to one side of the web in a predetermined pattern, as for example the pattern shown in FIG. 9.

The web may then pass under a heating mechanism which may be required to partially dry the adhesive, whereby its tackiness is improved causing it to function with greater effectiveness. The heating mechanism 16 may be chosen from a number of various forms, including an infrared heater as shown.

The next succeeding step of the method illustrated in FIG. 1 is the placement of a multitude of fibers onto the adhesive carried by the web. This is accomplished by the fiber deposition mechanism generally indicated at 20. The method involves the fibers being efficiently and substantially evenly distributed onto the adhesive pattern, and the fiber deposition mechanism 20 is one form of apparatus that will properly distribute them.

The fibers deposited onto the adhesive are of a length of approximately 2 inches, although other lengths could certainly be used. The length of the fibers is much greater than the size of the applied adhesive areas, and consequently the fibers adhere to the adhesive through only a small portion of their total length, thereby leaving one or more free portions of the fibers that are out of contact with the adhesive and are therefore free to be influenced during subsequent steps of the method.

The web carrying the fibers may be subjected to a second heating step from the heating mechanism generally indicated at 22 to further condition the adhesive for the succeeding steps of the method.

The web is subjected to an electrostatic field produced by the mechanism indicated generally at 24. The force of the electrostatic field applied to the web causes the free portions of the fibers to rise relative to the surface of the web. The moving web then passes under a nonconducting rotating roller 26, which is positioned at an angle relative to the web direction of movement. The upstanding portions of the fibers contact the roller which deflects them to the surface of the web at an angle relative to the web direction.

There may be residual static electricity present in the fibers, which may require the presence of a static eliminator 28 located downstream of the deflecting roller 26.

The final step of the method involves the web being joined or laminated to a second web that has been similarly processed in that it also has fibers aligned at an angle relative to its web direction. The lamination step joins the two webs so that the fibers are between the two webs. Although the fibers on either of the two webs will be parallel to other fibers attached to that web, the fibers on one web will be disposed at an angle to fibers of the other web. When the angular disposition of the fibers is substantially perpendicular, the tear strength characteristics of the laminate is enhanced because tearing the laminate in any direction requires the breaking of fibers rather than merely spreading them apart.

In the form of apparatus generally indicated in FIG. 1, the web originates from the takeoff reel 12 which is rotated by conventional drive means. The drive means is not shown as it, in and of itself, is not a part of the invention.

The web is passed through an adhesive applicator indicated generally at 14 which applies a liquid adhesive to one side of the web in a predetermined pattern. While the pattern is unique and is indicated in FIG. 9, the applicator 14 is of a conventional design and is not, in and of itself, a part of the invention. The web may then be subjected to a heating mechanism 16 to condition the adhesive for receiving the fibers that will be applied.

The web is passed through a fiber deposition mechanism indicated generally at 20 in FIGS. 1 and 3. As the web moves over rollers 143 and 144 and through the fiber deposition mechanism, fibers originating from the fiber bat 100 are stripped from the fiber bat at its end portion 102 by a high speed rotating cylindrical roll 104 which has a multiplicity of teeth 106 secured to its outer cylindrical surface. The teeth 106 on the roll 104 strip individual fibers from the fiber bat 100 and thrust them through the air corridor 108 into the air control zone indicated generally at 110, where they adhere to the adhesive on the web.

The roll 104 is suitably mounted on a shaft 112 which is journaled for rotation in bearing blocks 114 at both ends. The fiber bat 100 originates from a rotatably mounted fiber bat takeoff reel 116. The fiber bat 100 is fed along shelf 118 to the rotating advancing drum 120. The drum 120 is mounted on shaft 122 which is suitably journaled allowing it to rotate. The drum is spaced away from the shelf 118 by a distance sufficient to allow the fiber bat 100 to move between, but spaced closely enough to the shelf, so that the bat therebetween is sufficiently compressed and rotation of the drum advances the fiber bat into the teeth 106. The shelf 118 has an upturned end portion 124 at its end nearer the roll 104, which causes the end portion 102 of the fiber bat to be fed into the teeth at an angle, alleviating the tendency of the fibers to fall from the bat and facilitating a more even distribution of fibers into the corridor 108.

The cylindrical roll 104 has in close proximity to its outer surface, an enclosure 127 having an upper portion 126 and a lower portion 128, which are suitably connected as at 130. The enclosure 132 suitably isolates the drum 120 from external forces. An end portion of the enclosure 132 has an opening 134 to allow entrance of the fiber bat 100. The opposite end of the enclosure 132 is suitably mounted to an edge of the upper enclosure 126 by suitable means which may include hinges 136 as shown. The lower roll enclosure has a number of slots 138 which allow entrance of atmospheric air between the rotating roll 104 and the enclosure 128.

The opposite ends of the air control zone 110 are defined by side plates 140. A longitudinal opening is defined in enclosure 127 by the hinged portion 132 and a spaced enclosure edge 139, the opening as indicated at 141, providing for delivery from roll 104 of fibers and an air flow created by roll 104 into zone 110. Immediately adjacent the web 10 is a bottom plate 142 extending between the side plates 140. A curved damming blade 146 extends between the side plates 140, and between a point just above the web 10 and a point just below the outer surface of the roll 104.

After the fibers have been deposited on to the web and are adhering to the adhesive, the web may be subjected to heating mechanism 22 to further condition the adhesive for the remaining steps to be performed.

The web, now carrying the fibers, is passed through and subjected to an electrostatic field which is produced by the mechanism indicated generally at 24. An electrostatic generator 150 of a conventional design produces an electrostatic charge that is applied to upper plate 158 by traveling through conductor 152. The upper plate 158 is formed of an electrically conducting material, preferably encapsulated in a plastic or plastic-like material. The plate 158 is spaced above the web and is supported by clamps 154 which secure the plate to nonconducting supporting rods 156. The web travels over a lower plate 160 which is suitably grounded as indicated at 162. The downstream edge 164 of the upper plate 158 is directed at an angle to the web direction in close, substantially parallel proximity to angularly disposed deflecting roller 26.

The electrostatic field between the upper plate 158 and the lower plate 160 causes the free portions of the fibers on the web to assume a substantially upright position because of the force of attraction of the field. The field exists under the entire area of plate 158 which will cause the free portions to remain upstanding until they contact the deflecting roller 26 which, as sown, is so positioned at an angle to the web direction that the fibers may be expected to be deflected to the surface of the web at an angle approximately 45°.

Adjacent to and downstream of the deflecting roller 26 is a static eliminator 28 which removes any residual static electricity present in the web and deflected fibers. The static eliminator 28 may be necessary if the forces caused by residual static are great enough to displace the deflected fibers from their proper alignment.

The web is then joined with a second web 10' that has been similarly processed, by laminator 30 of conventional design the details of which do not, in and of themselves, form part of the invention. The laminate 11 may then be wound onto take up reel 32.

A variant form of fiber deflecting means, as indicated in FIG. 6, includes an air knife which includes a cylindrical hollow pipe 34 having nozzles 36 extending along its length. The nozzles 36 are positioned at an angle relative to the web direction so that air forced through them is directed towards the upstanding free portions of the fibers with a velocity sufficient to deflect the free portions to the surface of the web.

Another variant form of fiber deflection means is indicated generally at 38 in FIG. 11. A number of vertical, nonconducting vanes 40 are rotatably mounted at 42 to cross support 44, and physically deflect the upstanding fiber end portions to the surface of the web. The vanes may be adjusted about the axis 42 to vary the angle of deflection of the end portions, and may also extend into the area of the electrostatic field existing under the upper plate 159.

The predetermined pattern of the adhesive applied to the web is indicated in FIG. 9. Although the rectangular areas of adhesive 200 may be of many various sizes in relation to fiber length, favorable results can be expected with fibers of 2 inches in length when the areas are approximately one-fourth by one thirty-second of an inch, with the shortest distance between any two areas being approximately one-eighth of an inch.

A variant form of adhesive pattern is shown in FIG. 10. The rows of rectangular application areas 202 lie at an angle approximating 45° from the web direction and at 90° to the intended lie of the fibers to be deposited. Although the size of the rectangular areas could vary substantially, favorable results can be expected with 2-inch long fibers when the rectangular areas are approximately one-fourth by one-sixteenth of an inch. The areas of FIG. 10 are arranged in parallel rows with the areas of adjacent rows being offset as shown.

With increased web speed achieved by the invention, the particular web speed, length and intensity of the static field and nature of the fiber plowing or deflecting means will be correlated to ensure control and positioning of the fibers as described.

The use, operation and function of the invention are as follows:

The choice of the web material and other factors may affect the choice of adhesive to be applied. The method of the invention permits employment of webs of varying materials and characteristics, and conceivably a relatively thin plastic film could be used. The web 10 originates from a source 12 and is moved through the adhesive applicator 14 which applies the adhesive onto the web in a predetermined pattern such as that indicated in FIG. 9.

The adhesive applied to the web may be subjected to the heating mechanism 16, which may be an infrared heater or the like, to provide a desired tackiness. Particular adhesives may be employed to provide the desired adhesion without intermediate treatment.

The web is then passed through the fiber deposition mechanism 20 which deposits fibers onto the adhesive carried by the web in an even distribution. The fibers that are distributed upon the adhesive originate from a roll of fiber bat. Although the fibers may be of many other lengths, favorably results are obtained when the length of the fibers approximates 2 inches. The fibers may be formed of rayon staple and may vary from 1.5 to greater than 5 denier in size. The fiber bat is advanced by the advancing drum 120 into the teeth 106 of the high speed rotating roll 104. As the drum advances the bat, the teeth 106 rip the individual fibers from the bat and thrust them through the corridor 108 into the air control zone 110. The high speed rotation of the roll 104 within close housing 127 creates a substantial air flow or current immediately adjacent to its outer surface. Since the individual fibers are extremely small, light and flexible, they are easily influenced by air currents to which they are subjected.

The air control zone 110 is defined by the outer surface of the roll 104, the shelf 118, the web 10 and the damming blade 146. The control of the air within the zone 110 is indicated generally in FIG. 4. The high speed rotation of the roll 104 generates substantial air currents at or near the surface of the roll, generally indicated by the dotted or broken arrows. The solid arrows of FIG. 4 represent the entrance of the external or atmospheric air.

If the air currents carrying the fibers are attracted to a partial vacuum or low pressure area created by the high speed rotation of the roll 104, the likelihood of fiber escape or fiber congestion is greatly increased. Consequently, external atmospheric air must be available to neutralize these low pressure areas.

The roller 143 is positioned to allow proper clearance between the web and the lower portion of shelf 118 permitting entrance of atmospheric air so that fibers will not have a tendency to exit at that location.

When the web 10 is of a foraminous nature, the plate 142 prohibits external air from flowing through the web to the air control zone 110 and therefore tends to limit its entry to the opening between the roller 143 and web 10 and the bottom of the shelf 118. Additionally, a cushion of air is created between the web 10 and the plate 142 which tends to limit air flowing through a foraminous web from the air control zone 110.

Atmospheric air is admitted through the slots 138 to the area of closure 27 just beyond blade 146 to preclude air currents from carrying fibers between the surface of the roll 104 and the upper edge of the damming blade 146 as is shown. The slots 138 also resupply air to the area between the enclosure and the surface of the roll from which the air current that carries the fibers to the web is formed.

The enclosure 132, connected to enclosure 126 by the hinges 136, limits the supply of atmospheric air to the high speed rotating roll 104 in the area surrounding the end 102 of the fiber bat. The enclosure 132 has an opening 134 allowing the entrance of the fiber bat.

The side plates 140, the web 10 and the damming blade 146 all serve as isolation barriers enclosing and defining the air control zone 110 effective to control the air carrying the fibers through corridor 108 into the air control zone 110 and onto web 10. The damming blade 146 blocks the air stream created by the rotation of roll 104 and prohibits the fibers from remaining upon and being carried through a complete revolution by the roll. The camming blade is preferably convexedly curved toward web 10 to prevent fibers from accumulating on the blade and subsequently falling onto the web in lumps. The effect of the damming blade creates a partial vacuum downstream from the blade in the space between the roll 104 and the enclosure 128 which has a tendency to attract fibers between the damming blade and the surface of the roll. To alleviate the partial vacuum, slots 138 are formed in the lower enclosure 128 allowing atmospheric air to enter between the enclosure and the roll.

After the fibers have been deposited onto the adhesive, the web may be subjected to another heating mechanism to further condition the adhesive for the ensuing steps of the method.

The fibers deposited onto the adhesive are many times longer than the rectangular adhesive areas indicated in FIGS. 9 and 10. Contact of the fiber with an adhesive area causes the fiber to adhere through only a small portion of its total length. This allows the fibers to have one or more free end portions which are out of contact with the adhesive, and therefore are responsive to external forces.

The continuously moving web is then subjected to the electrostatic field that exists between the upper plate 158 and the grounded lower plate 160. The electrostatic generator 150 produces an electrostatic field that may range from 35,000 to 50,000 volts, while having a current of only three-fourths to 1 milliampere. The electrostatic field charges the free portions of the fibers and attracts them toward the upper charge plate 158 with such force that they assume an upstanding position relative to the surface of the web. The free portions will remain upstanding while they are under the influence of the electrostatic field, which encompasses the area immediately below the upper plate 158.

As the moving web continues, the fibers move beneath the angled edge 164 of the plate 158. Immediately adjacent the edge 164 is a nonconducting rotating deflecting roller 26 which is positioned at substantially the same angle relative to the web direction. The roller deflects the upstanding free portions of the fibers to the surface of the web at an angle to the web direction. In the event any residual static electricity remains in the web and fibers, a static eliminator of a conventional design may be employed to remove the static from the fibers, as indicated at 28. When the deflection means of FIG. 6 is employed, the moisture content of the angled fiber deflecting air stream produced by nozzles 36 may be controlled to eliminate such static.

The remaining step to be accomplished is to laminate the web having the properly aligned fibers to a second web that has been similarly processed. The lamination step joins the two webs in a single laminate with the layers of fibers between the two webs and with the fibers oriented such that the fibers on one web are substantially perpendicular to the fibers on the second web. The resultant laminate has a structure similar to that shown in FIG. 8.

Although the laminate of FIG. 8 has two webs, the laminate thus produced could be used as a web material itself, and processed in accordance with the invention to result in a multilayered laminate product.

Similarly, when desired, the fibers of one layer between a set of webs may be positioned with respect to the fibers of the second layer between said webs at angle that are other than perpendicular angles, the angular fiber orientation being achievable by adjustment and selective arrangement of a plow or deflecting means such as those illustrated at 26, 34 and 40.

We claim:

1. The method of forming a nonwoven reinforced laminate comprising the steps of
   moving a first web of relatively thin flexible material in a first direction along a predetermined route,
   applying an adhesive to the web,
   depositing fibers onto the adhesive whereby substantially all of the fibers have one or more free portions out of contact with the adhesive,
   causing the free portions of the fibers to assume an upstanding position relative to the surface of the web,
   deflecting the free portions to the surface of the web at an oblique angle relative to said first direction,
   simultaneously moving a second web in a second direction which is converging upon said first direction,
   applying an adhesive to said second web,
   depositing fibers on said last named adhesive whereby substantially all of said fibers have one or more free portions out of contact with said adhesive,
   causing said free portions to assume an upstanding position relative to the surface of said second web,
   deflecting said free portions at an oblique angle relative to the direction of said second web, and
   laminating said first and second webs whereby the fibers of said first web contact the fibers of said second web and the fibers of said first web are angularly disposed with respect to the fibers of said second web.

2. The method of claim 1 wherein said adhesive is deposited in a predetermined pattern.

3. The method of forming a nonwoven reinforced laminate comprising the steps of:
   moving a web of relative thin flexible material in a first direction along a predetermined route,
   applying an adhesive to said web,
   separating fibers from a fiber bat,
   transferring said fibers to a fiber control zone,
   depositing said fibers onto said web whereby substantially all of the fibers have one or more free portions out of contact with the adhesive,
   causing said free portions to assume an upstanding position relative to the surface of said web,
   deflecting said free portions to the surface of the web at an oblique angle relative to said first direction,
   simultaneously moving a second web in a second direction which is converging upon said first web,
   applying an adhesive to the second web,
   separating fibers from a second fiber bat,
   transferring the last named fibers to a second fiber control zone, depositing the last named fibers on the adhesive whereby substantially all of the fibers have one or more free portions out of contact with the adhesive, causing the free portions to assume an upstanding position relative to the surface of the second web, deflecting the free portions to the surface of the second web at an oblique angle relative to said second direction, and laminating the first web to the second web whereby the fibers of said first web are in contact with the fibers of said second web and the fibers of said first web are substantially perpendicular to the fibers of said second web.

4. The method of claim 3 wherein separating said fibers from said bat includes the steps of providing an applicator roll, rotating said roll at high speed, advancing the bat to said roll whereby individual fibers are dislodged from said bat, and said transferring and depositing steps include enclosing said roll in a housing to create an air flow toward said web in response to rotation of said roll, and subjecting said fibers to said flow.

5. The method of claim 4 characterized by and including the steps of providing a defined air flow control zone, limiting of the entry of external air adjacent one end of said zone, damming the flow of air created by said roll rotation adjacent another end of said zone to control said flow within said zone, and supplying atmospheric air to the roll rearwardly of said zone.

6. The method of claim 1 further characterized in that the step of causing the free portions to assume an upstanding position relative to the surface of the web includes subjecting the fibers to an electrostatic field for a time sufficient to cause said free portions to rise from the surface of the web.

7. The method of claim 1 characterized by and including the steps of applying said adhesive in a predetermined pattern housing individualized adhesive area and correlating the size of said areas and the length of said fibers whereby said free portions are created.

8. The method of claim 1 further characterized by the step of subjecting said adhesive to heat prior to depositing fibers onto said adhesive.

9. The method of claim 1 further characterized by the step of subjecting said adhesive to heat after depositing said fibers and prior to the step of causing said free portions to assume an upstanding position relative to the surface of the web.

10. The method of claim 1 further characterized in that the step of deflecting the free portions to the surface of the web includes subjecting the fibers to a nonconducting rotating cylinder, said cylinder being positioned at an angle relative to said direction and striking the free portions thereby deflecting said free portions to the surface of the web.

11. The method of claim 1 further characterized in that the step of deflecting the upstanding free portions to the surface of the web includes subjecting the free portions to an air stream flowing at said oblique angle, said air stream deflecting the free portions to the surface of the web.

12. The method of claim 11 characterized by and including the step of controlling the moisture content of said air stream to eliminate static electricity from said fibers.

13. The method of claim 1 further characterized by the step of subjecting the web and the fibers thereon to the action of a static eliminator subsequent to the step of deflecting the free portions to the surface of the web.

14. The method of claim 1 further characterized by the step of urging said fibers into greater adhesion with said adhesive just prior to the step of causing the free portions to assume an upstanding position relative to the surface of the web.

15. The method of claim 2 further characterized in that the predetermined pattern of adhesive applied to the web includes a multiplicity of rectangular application areas, said rectangular areas being spaced apart from each other, forming rows at an oblique angle relative to said direction, being longitudinally offset from adjacent rectangular areas in adjacent rows, and having a length and width substantially less than the predetermined length of the fibers.

16. The method of claim 2 further characterized in that the pattern of adhesive applied to the web includes a multiplicity of rectangular application areas, said rectangular areas being spaced apart from one another, positioned on the web whereby approximately half of the areas are parallel and approximately half are perpendicular to said direction, forming rows of areas whereby alternating areas are in line with one another and adjacent areas are perpendicular to one another, and having a length and width substantially less than the predetermined length of the fibers.

17. The method of making a laminated web product having oriented fibers between a pair of laminated webs which includes the steps of securing portions of said fibers to said webs, erecting the remaining portions of said fibers, deflecting said erected portions onto the surfaces of said webs in a desired orientation, and laminating said webs with said fibers therebetween.

18. The method of orienting fibers on a web which includes securing portions of the fibers to the web, erecting the remaining portions of said fibers, and deflecting said remaining portions onto the surfaces of said webs in their desired oriented position.

* * * * *